United States Patent [19]
Kiraly

[11] Patent Number: 5,757,600
[45] Date of Patent: May 26, 1998

[54] REVERSE BATTERY PROTECTION CIRCUIT

[75] Inventor: Laszlo Kiraly, El Segundo, Calif.

[73] Assignee: International Rectifier Corporation, El Segundo, Calif.

[21] Appl. No.: 947,922

[22] Filed: Oct. 9, 1997

Related U.S. Application Data

[63] Continuation of Ser. No. 707,093, Sep. 3, 1996, abandoned, which is a continuation of Ser. No. 390,707, Feb. 17, 1995, abandoned.

[51] Int. Cl.⁶ .......................................... H02H 3/18
[52] U.S. Cl. ........................................... 361/84; 307/127
[58] Field of Search ........................... 361/82, 84; 307/127

[56] References Cited

U.S. PATENT DOCUMENTS

| | | | |
|---|---|---|---|
| 4,857,985 | 8/1989 | Miller | 361/82 |
| 5,179,337 | 1/1993 | Staarman et al. | 320/40 |
| 5,179,488 | 1/1993 | Rovener | 361/58 |
| 5,410,441 | 4/1995 | Allman | 361/84 |

*Primary Examiner*—Jeffrey A. Gaffin
*Assistant Examiner*—Michael Sherry
*Attorney, Agent, or Firm*—Ostrolenk, Faber, Gerb & Soffen, LLP

[57] ABSTRACT

In order to protect a polarity-sensitive load from a reversed battery assembly, the drain and source electrodes of a MOSFET (or bipolar transistor) device are connected in series with the load and battery and its gate electrode is connected to or otherwise coupled to a node between a battery terminal and the load. If the battery is inserted with correct polarity, the transistor is turned on and inserts its small on-resistance into the circuit. If the battery is inserted with incorrect polarity, the transistor does not turn on, and the polarity-sensitive load is protected.

3 Claims, 2 Drawing Sheets

5,757,600

REVERSE BATTERY PROTECTION CIRCUIT

This is a continuation of application Ser. No. 08/707,093, filed Sep. 3, 1996,now abandoned which is a continuation of application Ser. No. 08/390,707 filed on Feb. 17,1995, now abandoned.

BACKGROUND OF THE INVENTION

This invention relates to a reverse battery protection circuit, and more specifically relates to the use of a power MOSFET to protect polarity-sensitive load circuits from damage due to the connection of a battery or other d-c source with incorrect polarity.

It is known that a diode connected in series with the load terminals of a polarity-sensitive load, having its anode connected to the positive load terminal and the battery terminals, can block load current flow if a battery, or other d-c source, is connected to the load with improper polarity. Similarly, a reverse polarity diode can be connected with its cathode connected to the negative load terminal. In either case, however, the forward voltage drop of such diode is about 0.6 volts and, therefore, contributes substantially to a reduction in the voltage of a very low voltage d-c source circuit, for example, one using a 6 volt battery or the like.

To avoid this voltage drop, such diodes have been connected in parallel with the d-c source terminals and load terminals and in series with a fuse which is also in series with the load. The diode is poled to conduct in its forward conduction direction when the battery is incorrectly connected, thus blowing the fuse and protecting the load. This has the obvious drawback that, to reset the circuit, the fuse must be replaced.

BRIEF DESCRIPTION OF THE INVENTION

In accordance with the present invention, a transistor, preferably a MOSFET, for example, an N channel vertical conduction power MOSFET, such as a HEXFET power MOSFET manufactured by the International Rectifier Corporation of El Segundo, Calif. is connected in the position of a prior art reverse polarity diode, with its drain connected to the d-c source negative terminal and its gate is coupled to the positive d-c source terminal. If the battery polarity is correct, the voltage between source and gate turns on the MOSFET. Thus, the only forward voltage drop is that due to the low on-resistance of the MOSFET. However, if the polarity is incorrect, the MOSFET is off and blocks current flow. If the MOSFET is of the type having an inherent body diode, it is connected so that the inherent body diode is poled to block load current flow when polarity is incorrect. A bipolar transistor may also be used as described above.

DETAILED DESCRIPTION OF THE DRAWINGS

Figure 1:
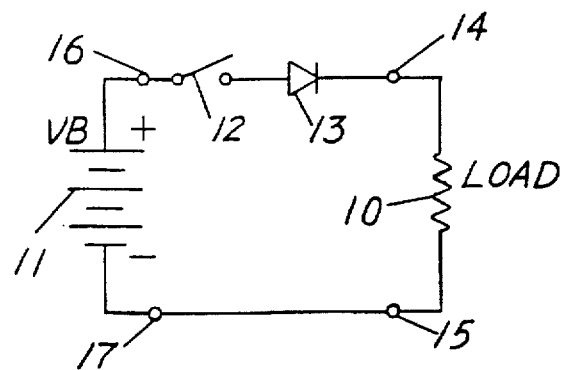
FIG. 1 is a prior art circuit using a diode to prevent conduction if a battery is reversely connected to a d-c load.

Referring first to FIG. 1, there is shown a d-c load 10 which can be any type of load which is sensitive to input d-c power polarity. A d-c source 11, which may be a battery or any other source of d-c voltage, is connected to load 10 through on-off switch 12 and diode 13. Load 10 has positive terminal 14 and negative terminal 15. Battery 11, which has any desired voltage $V_B$, which could be as low as, for example, 1.5 volts, is physically mounted in a suitable bracket (not shown) to positive and negative d-c supply terminals 16 and 17, respectively.

It is frequently possible to mistakenly connect the d-c source or battery 11 to terminals 16 and 17 with incorrect polarity. In that case, load 10 can be damaged if it is polarity-sensitive. However, diode 13 is poled to block current flow through load 10 if the positive d-c source terminal is connected to terminal 17 instead of 16. The drawback of the circuit of FIG. 1 is that the forward voltage drop on diode 13 is about 0.6 volts, which can interfere with or prevent operation of load 10 if the d-c voltage $V_B$ is low, for example, 1.5 volts.

Figure 2:
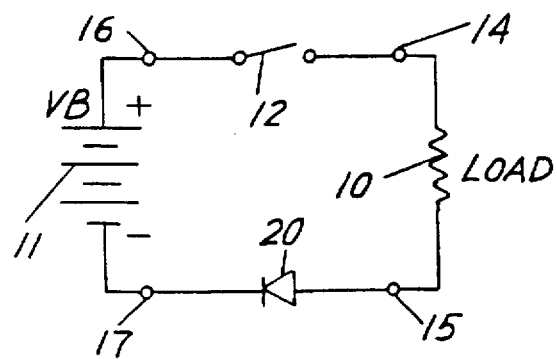
FIG. 2 is a prior art circuit, like that of FIG. 1, but using a reverse polarity diode.

It is also possible to use a reverse polarity diode 20, connected as shown in FIG. 2, where parts similar to those of FIG. 1 have the same numerals. However, this circuit also suffers from the disadvantage of the 0.6 volt forward voltage drop during normal operation.

Figure 3:
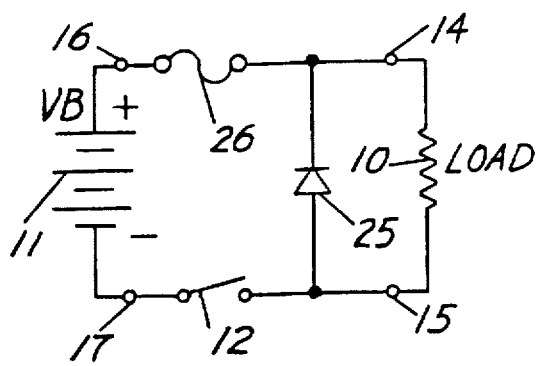
FIG. 3 is a prior art circuit like that of FIG. 1, using a diode and fuse.

FIG. 3 shows a further prior art circuit which avoids the problem of the diode drop of the circuits of FIGS. 1 and 2 but requires added components. Thus, in FIG. 3, diode 25 is connected in parallel with load 10 and in series with fuse 26. Fuse 26 will blow if the battery 11 is reversely connected. To reset the circuit, however, the fuse 26 must be replaced.

Figure 4:
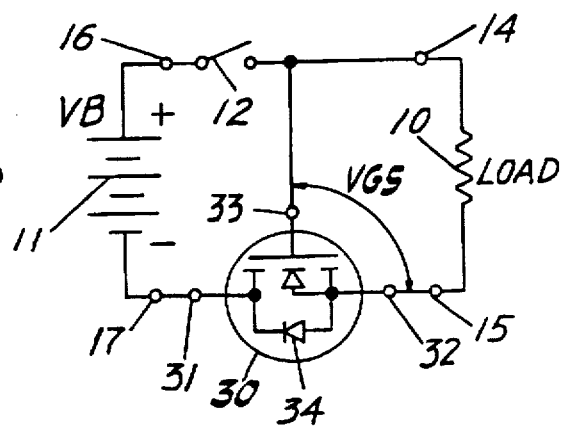
FIG. 4 is a circuit diagram showing the present invention.

FIG. 4 shows the present invention in which an N channel vertical conduction power MOSFET 30 is connected at the position of reverse polarity diode 20 in FIG. 2. MOSFET 30 has a drain electrode 31 connected to negative terminal 17, a source terminal 32 connected to negative load terminal 15, and a gate terminal 33 connected to positive load terminal 14. The MOSFET 30 also has an inherent diode 34, poled as shown in FIG. 4, and like the reverse polarity diode 20 of FIG. 2.

In operation, when the d-c source polarity is correct and switch 12 is closed, a gate to source voltage $V_{GS}$ appears which is voltage $V_B$ minus the voltage drop $V_{BODY}$ which appears across the diode 34. MOSFET 30 is chosen to turn on at this gate voltage so that the MOSFET on resistance is the only added circuit resistance. By choosing a sufficiently large MOSFET, any desired low added resistance is inserted into the circuit. If, however, the battery 11 is reversely connected, the MOSFET is not turned on and body diode 34 blocks the flow of load current. A typical MOSFET which can be chosen for this circuit is the HEXFET MOSFET Type IRF 830.

In the above circuit of FIG. 4, it is useful to add a gate resistor to the gate of the MOSFET 30 (not shown). Furthermore, the MOSFET 30 can be an N channel device as shown, or a P channel device. Moreover, a MOSFET without a body diode could also be used in place of the vertical conduction MOSFET 30.

Figure 5:
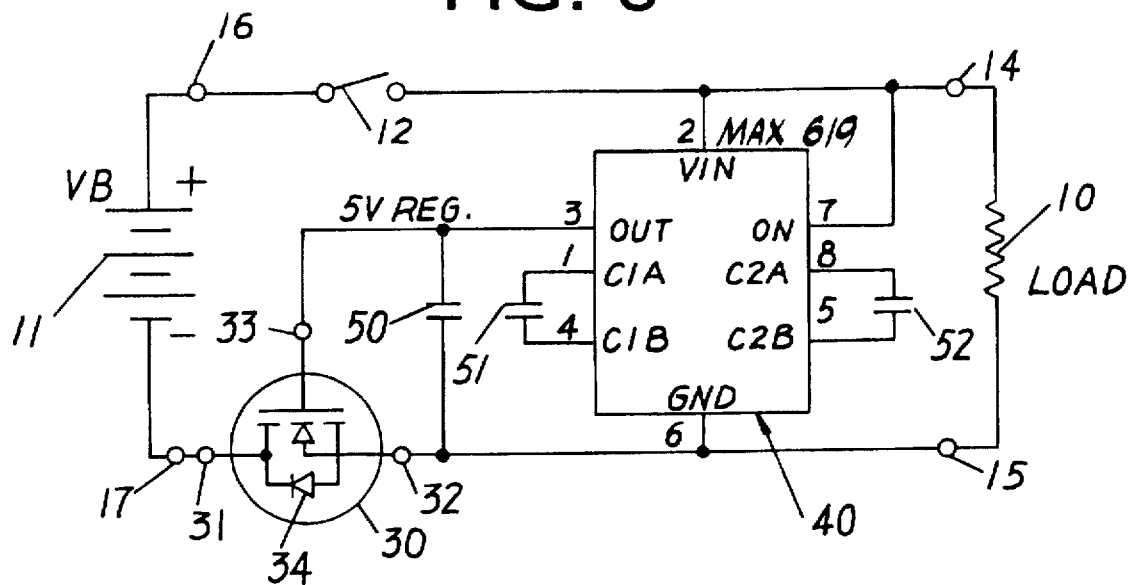
FIG. 5 is a circuit diagram of an improvement of FIG. 4 using a switched capacitor voltage converter to ensure turn on of the MOSFET when the d-c battery is correctly poled.

If the d-c source voltage VB is very low, for example, less than 5 volts, MOSFET 30 of FIG. 4 may not reliably turn on when switch 12 is closed. In such a case, terminal 33 may be coupled to terminals 16–14 by a voltage amplifier means. Thus, as shown in FIG. 5, a switched capacitor voltage converter chip 40 can be used to couple gate terminal 33 to terminals 16–14. Chip 40 can be a MAX619 chip which will convert an input voltage of from 2.0 to 3.6 volts at terminal 16 to 5 volts at the gate terminal 33, thus reliably driving MOSFET 30 into conduction when the battery 11 is properly connected. Note that three 0.1 microfarad capacitors 50, 51 and 52 are connected to the pins of chip 40 as shown.

In the above description, MOSFET 30 could be any desired MOS gated device and, for example, includes IGBTs with similar poling.

Figure 6:
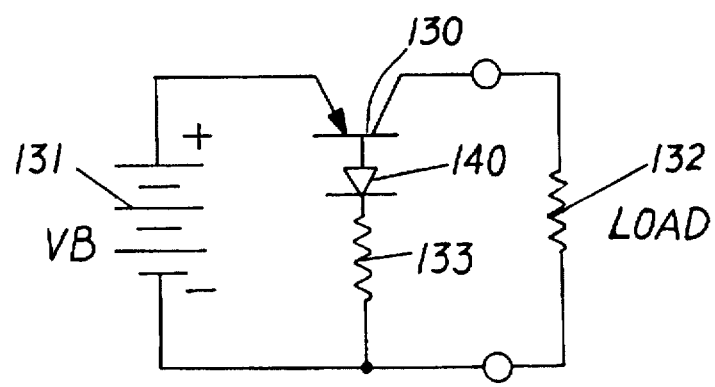
FIG. 6 is a circuit diagram of the invention employing a bipolar transistor instead of a MOSFET.

FIG. 6 shows the manner in which the invention can be carried out with a PNP bipolar transistor 130. Thus, a battery 131 of voltage $V_B$ is provided to drive d-c load 132 through the emitter-collector circuit of transistor 130. A resistor 133 connects the base of transistor 130 to the negative terminal of battery 131.

During normal operation, the base-emitter diode of transistor 130 is forward biased through resistor 133. Transistor 130 turns on, and an output voltage of $V_B-V_{CE(sat)}$ is applied to the load.

However, if battery 131 is inserted with reverse polarity, the emitter potential of transistor 130 is $(-)V_B$ and transistor 130 is off, to disconnect the load 132 from the battery 131.

A diode 140 is added to the circuit of FIG. 6 if the voltage of the battery 131 is higher than the base-emitter breakdown voltage of transistor 130 (typically 7 volts). Without diode 140, the battery 131, when reversely connected, can cause the base-emitter junction to break down. Diode 140 prevents such breakdown.

It will be apparent to those skilled in the art that the invention could also be applied to use with an NPN bipolar transistor.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A circuit for supplying polarity-sensitive apparatus, which apparatus being operable by a battery which is removably connected with respect to the apparatus; said circuit including first and second terminal means for receiving the anode and cathode terminals respectively of a battery; first and second load terminals connected to said polarity-sensitive apparatus; said first load terminal being coupled to said first terminal means for receiving said anode of said battery; and a protective circuit coupled between said first and second terminal means and said first and second load terminals, said protective circuit consisting of: a single MOSFET having a drain electrode, a source electrode and a gate electrode; said source electrode connected to said second load terminal; said drain electrode connected to said second terminal means which receives said cathode terminal of said battery; said gate electrode being coupled to a node between said first terminal means for receiving said anode of said battery and said first load terminal; a switch element connected in series with said first terminal means and said node; and a voltage amplifier circuit consisting of a single chip and being connected between said node and said gate electrode to convert an input voltage supplied to said chip to an output voltage between said gate electrode and said source electrode that is about 1.4 to 2.5 times said input voltage to turn on said single MOSFET, said voltage amplifier circuit being connectable to at least one capacitor; whereby, if said battery is properly connected with said anode and said cathode terminals connected to said first and second battery terminals respectively, said single MOSFET is turned on and, if said battery is reversely connected, said single MOSFET is off and blocks load current flow through said load.

2. The circuit of claim 1 wherein said MOSFET has a diode having its cathode connected to said drain electrode and its anode connected to said source electrode.

3. The circuit of claim 2 wherein said MOSFET is a vertical conduction power MOSFET and said diode is the inherent body diode of said power MOSFET.

* * * * *